R. C. SAYER.
COLLECTOR FOR ELECTRIC TRACTION.
APPLICATION FILED JULY 12, 1912.
1,166,637.
Patented Jan. 4, 1916.
5 SHEETS—SHEET 4.
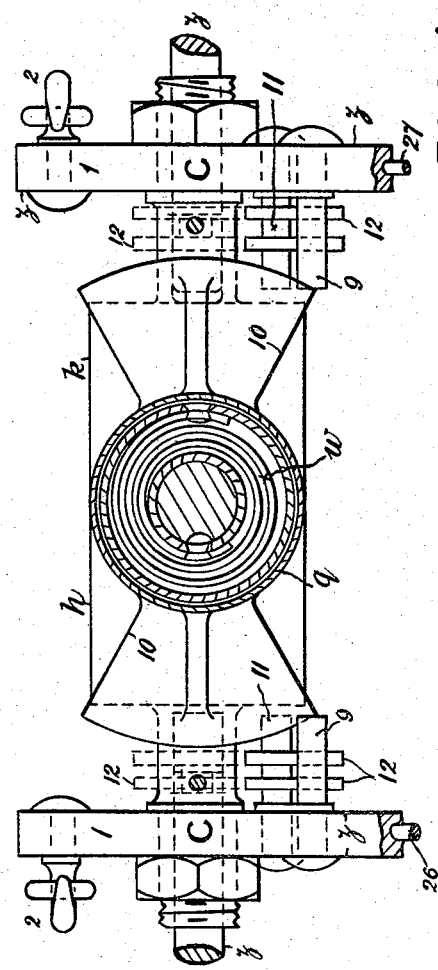
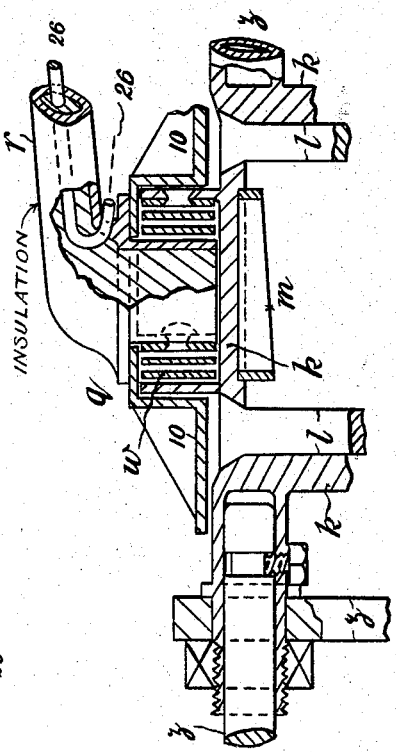

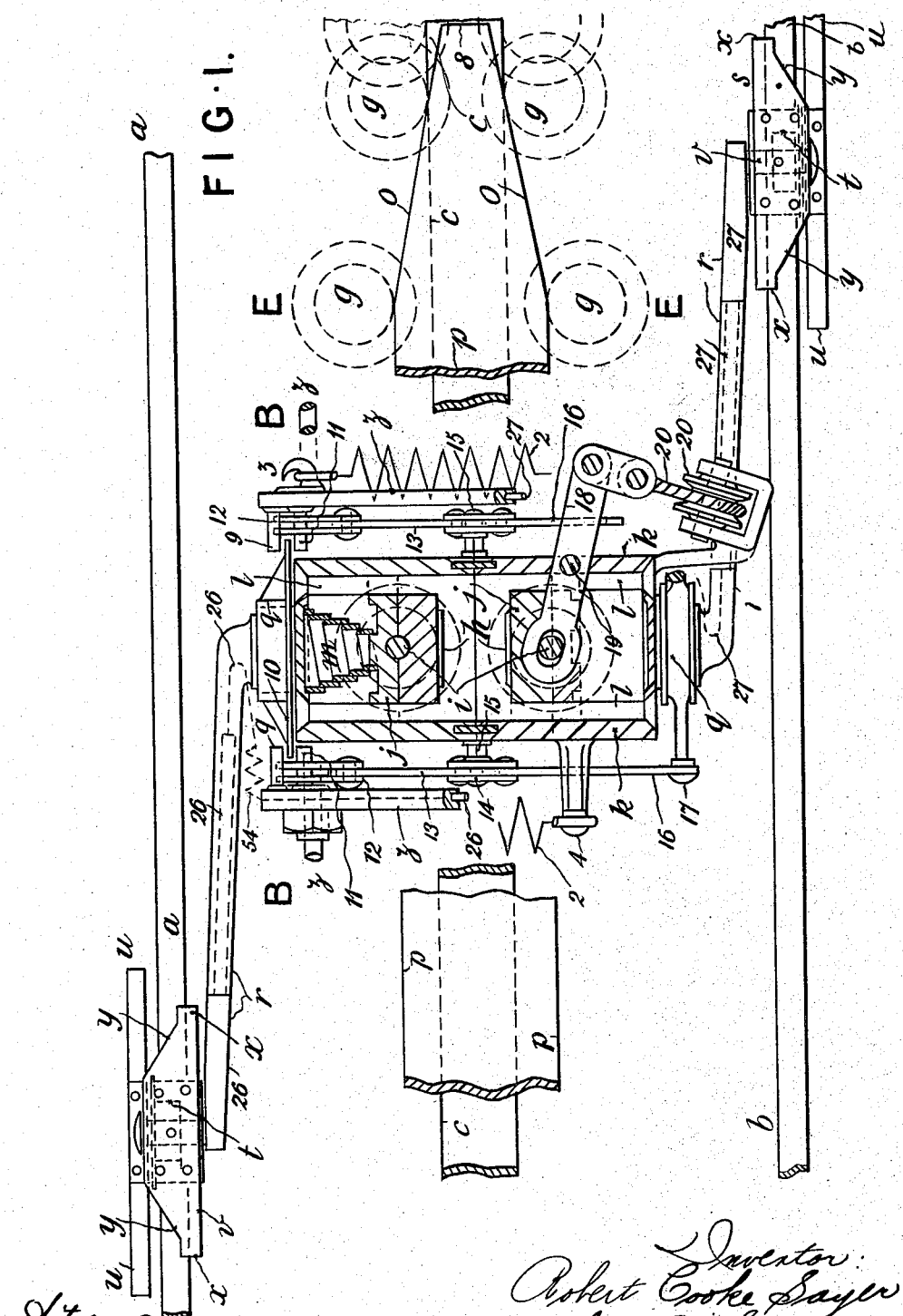
R. C. SAYER.
COLLECTOR FOR ELECTRIC TRACTION.
APPLICATION FILED JULY 12, 1912.
1,166,637.
Patented Jan. 4, 1916.
5 SHEETS—SHEET 1.

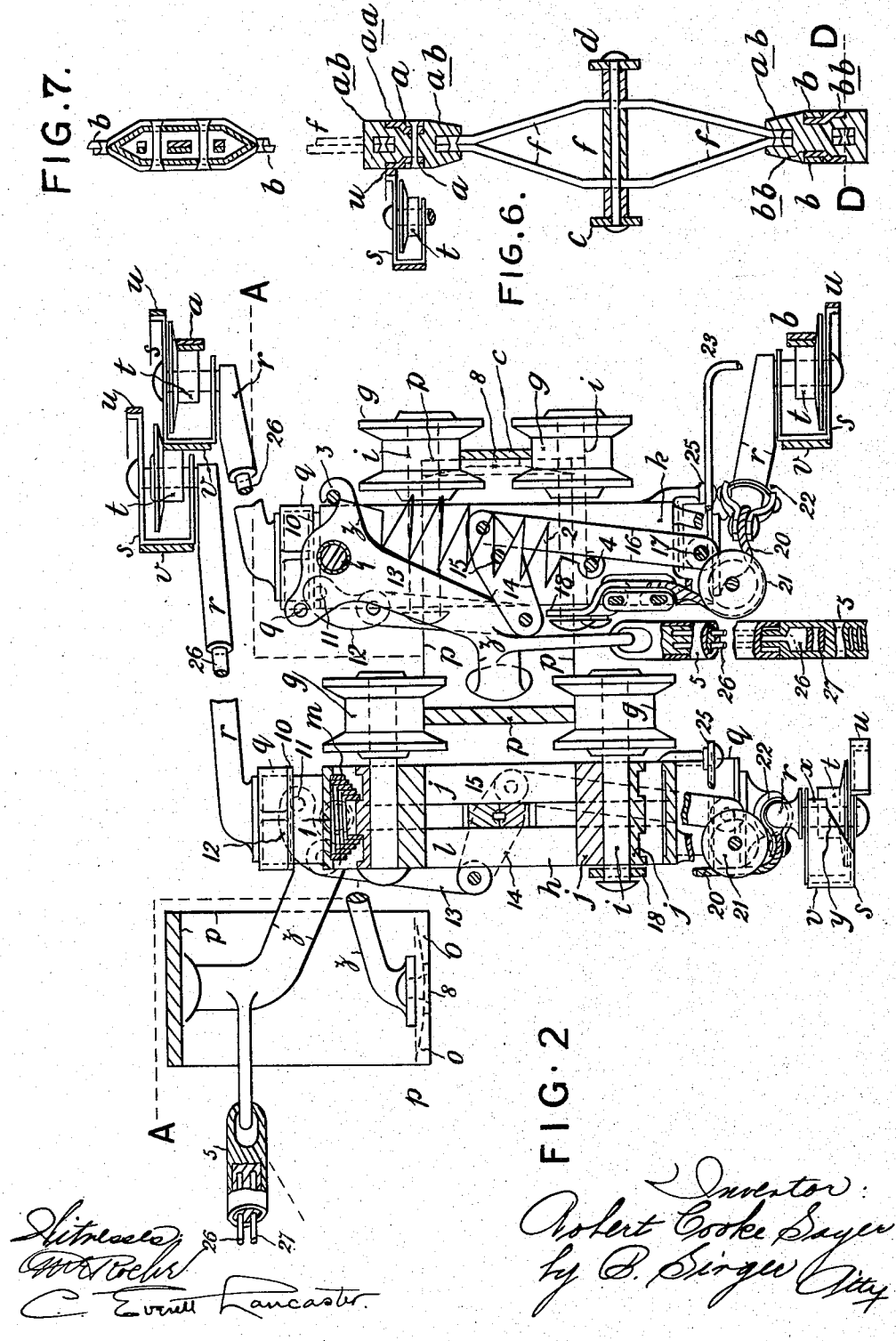

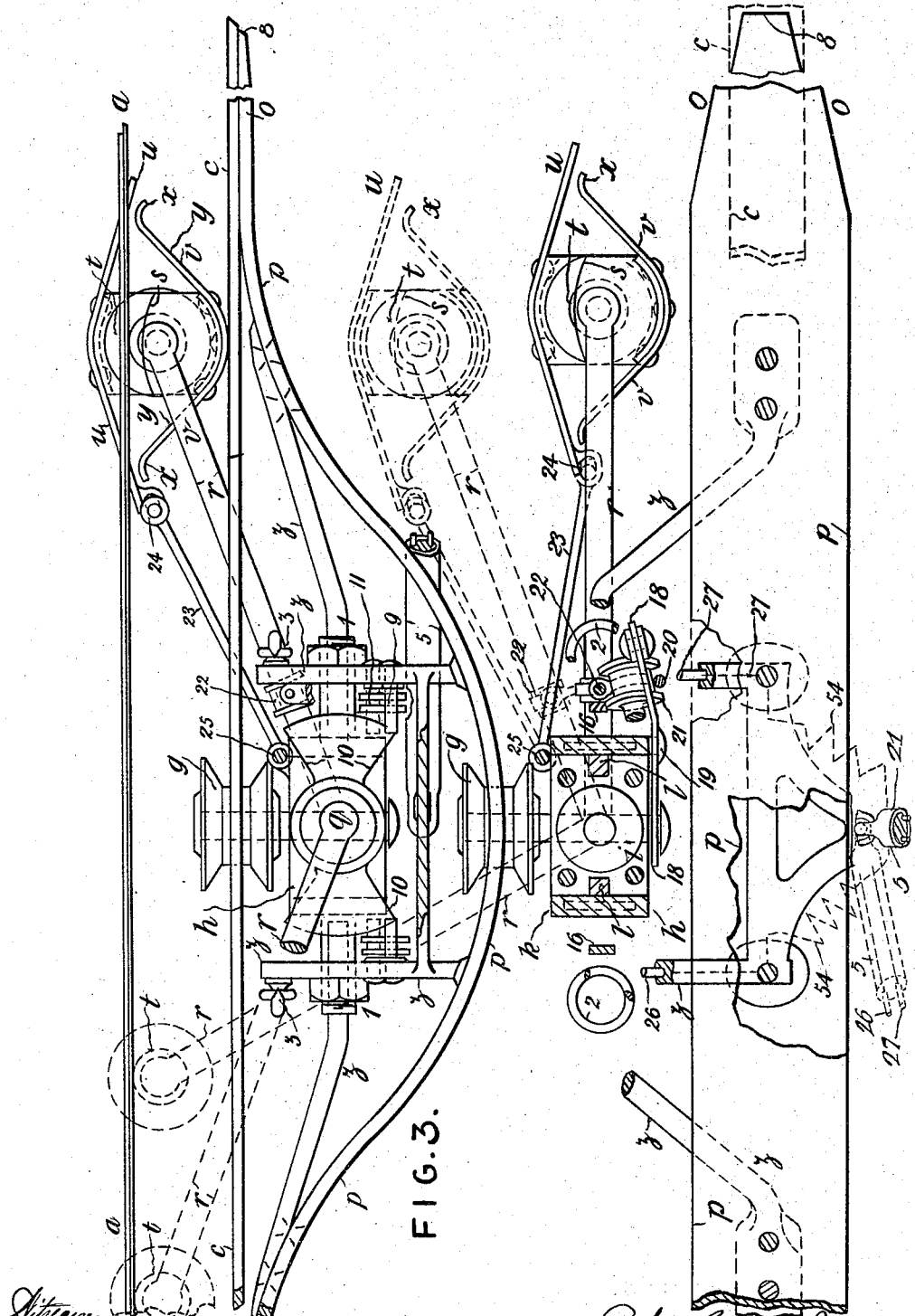

R. C. SAYER.
COLLECTOR FOR ELECTRIC TRACTION.
APPLICATION FILED JULY 12, 1912.
1,166,637.
Patented Jan. 4, 1916.
5 SHEETS—SHEET 5.
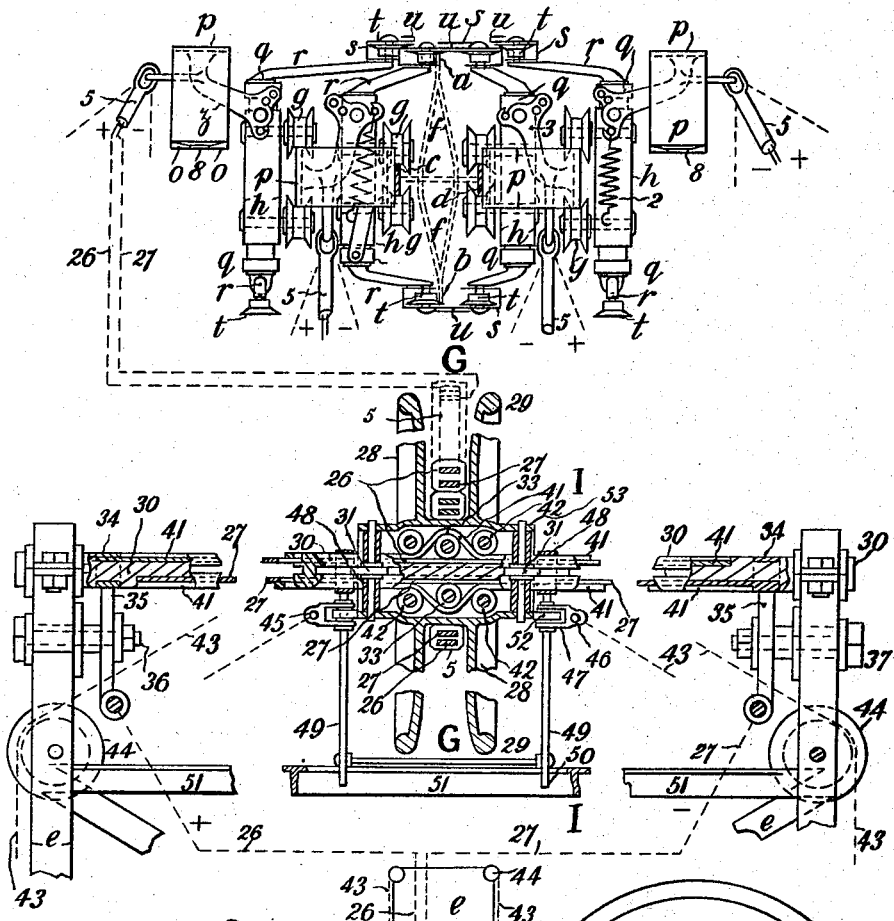

UNITED STATES PATENT OFFICE.

ROBERT COOKE SAYER, OF REDLAND, NEAR BRISTOL, ENGLAND.

COLLECTOR FOR ELECTRIC TRACTION.

1,166,637.  Specification of Letters Patent.  Patented Jan. 4, 1916.

Application filed July 12, 1912. Serial No. 709,110.

*To all whom it may concern:*

Be it known that I, ROBERT COOKE SAYER, a subject of the King of Great Britain, residing at Redland, near Bristol, in the county of Gloucester, Kingdom of England, have invented certain new and useful Improvements in Collectors for Electric Traction, of which the following is a specification.

My invention provides an improved collector for electric traction which enables any number of motor cars running on parallel tracks and drawing driving current from a common conductor line, to pass each other without any complicated interference of their trolley collectors.

The invention is shown in detail by the following specification and drawings, in which, Figure 1 is a sectional side elevation of a trolley in relation to its carrying rails and conductors. Fig. 2 is an end elevation of Fig. 1, with another trolley shown in section passing it on its rail on the same side of the main conductors, the positive arm being shown broken to show the contact wheels, although shown as passing one another synchronously with the passing of the trolleys, their actual passing occurs later. Fig. 3 is a sectional plan at the line A—A Fig. 2. Fig. 4 is a sectional plan at the line B—B Fig 1. Fig. 5 a section at the line C—C Fig. 4. Fig. 6 is a section of the main rails, conductors, and a contacting wheel at supports. Fig. 7 a section at the line D—D Fig. 6. Fig 8 an end view in three parts, the upper part being similar to Fig. 2 with its two trolleys duplicated the other side of the main conductors, the inner two are carried on the main rails, the right hand one without stopping having displaced a trolley standing with its rail up, and diverted it to the outside position upon its own rail which was lowered for the purpose, the outer left hand trolley is passing the inner one without stopping, upon the lowered rail of the inner trolley as it obtains current and returns it to the main conductor, the outer trolleys receiving and returning the current through the inner, those on the right hand doing so through the frames of their contact wheels. The center part of Fig. 8 is a section in three parts at the line F—F Fig. 9 and shows the means for adjusting the cable, one only of the four vehicles served by the four trolleys being shown as the third, lower part of the Fig. 8. Fig. 9 is in part a section at the line G—G Fig. 8. Fig. 10 is a half section at the line H—H Fig. 9. Fig. 11 a sectional elevation at the line I—I Fig. 8.

In the drawings $a$ indicates the main positive conductor, $b$ the negative, $c$ the side rail for one set of vehicles $e$, $d$ that for the others, each spaced at a distance from $a$ and $b$ so as to enable their being connected together, and to the conductors $a$ and $b$, through their supports $f$, as shown in Fig 6.

The trolley $h$ Fig 1 consists of the wheels $g$ which run on the rails $c$ or $d$, with spindles $i$, in proper bearings $j$, within a frame $k$ formed in two parts connected by bolts $l$ that act as slide guides to the bearings $j$ which are so placed as to rest against the bolts $l$ and slide thereon when they are thrust apart against springs $m$, only one of which is shown in section in the drawings, as follows:—Above and below, the frame $k$ carries a turntable $q$, each with an insulated arm $r$, a frame $s$, a contact bevel flange wheel $t$ somewhat coned and free on its spindle which it is able to traverse vertically and run against the positive conductor $a$, and its fellow against the negative conductor $b$, the tables $q$ have a spring $w$ to thrust their arms $r$, frames $s$, laterally and their wheels $t$ into contact with the conductors $a$ $b$. It is desirable that the arm $r$ be insulated in order to prevent grounding the conductor 26 which passes therethrough to make electrical connection with the wheel $c$. A frame $s$ has a curved spring $u$ attached to the frame $s$ preferably by screws or rivets to ease it when passing the supports $f$ which carry on the conductors $a$ and $b$, branch conductors $a$ $a$, $b$ $b$, Fig. 6 for them to contact with; a spring $v$ attached to the frame $s$ preferably by screws or rivets with curved ends $x$ Fig. 3, and a raised back connected to them by inclines $y$ to ease it when passing around the frame $s$ of another trolley $h$ when two vehicles $e$ Fig. 2 pass, as follows: The trolley $h$ also has a bridge rail $p$ of greater depth than the rails $c$ $d$, formed with knife edge ends 8 of less depth than the rails $c$ $d$, and inclines $o$ tapering them, and is connected by arm levers $z$ to hinge on the frame $k$ at 1; the arms $z$ carry one end of the springs 2 at 3 that are connected to the frame $k$ at 4 to keep the rail $p$ raised when it is intended its trolley $h$ shall pass over the rail $p$ of another trolley $h$, and when it is raised the upper table $q$, its arm $r$, frame $s$ and wheel $t$ are raised by the pin 11 fixed on the arm $z$ acting on a flange 10 on the table $q$; the same pin 11 carries the links 12 12 which carry the link 13 connecting with the lever 14 which is pivotally pinned on the frame $k$ at 15, the other end of which connects by the link 16 and swivel pin 17 the lower table $q$ to it with its arm $r$ frame $s$ and wheel $t$.

When desired, the special negative conductor $b$, the table $q$, arm $r$, frame $s$, and contact wheel $t$ that act against it are omitted, and the rail $c$ or $d$ is used instead.

When it is desired a trolley $h$ shall be ready for another to pass around it upon its rail $p$, Fig. 2 strain by hand or in any suitable manner is put upon the flexible cable 5 which pulls against the force of the spring 2 to bring its knife edge ends 8, Fig. 3 against the main rail $c$, the top table $q$, its arm $r$, frame $s$, and wheel $t$ are lowered, and the lower table $q$ with its similar parts are raised, by a second pin 9 on the levers $z$ acting on the flange 10 of the top table $q$ together with the horizontal action of the spring $w$, thus enabling the wheels $g$ of the other trolley $h$ traversing the main rail $c$ to traverse the inclines $o$ against the springs $m$, take the several positions shown dotted on Fig. 1, raise the flange of the top wheel $g$ above, and lower the bottom one below the main rail $c$, and thereby enable the trolley $h$ to pass over the bridge-rail $p$ of the former trolley $h$ around clear of it laterally, and again run upon the main rail $c$ as the springs $m$ draw them together.

The spindle $i$ of the lower wheel $g$ carries the end of a lever 18 pivoted on the frame $k$ at 19 and at the other end connects a cord or link 20, Figs. 1, 2, 3, passing over a pulley 21 on the frame $k$ and connects the arm $r$ at 22 so that as the wheel $g$ descends the lower incline $o$ of the rail $p$ of the trolley $h$ passing, its negative arm $r$ frome $s$ and wheel $t$ are opened, from the conductor $b$ as shown in the upper and middle dotted positions Fig. 3 to the lower position, the frame $s$ being held in position by the link 23 hinging on it at 24 and on the frame $k$ at 25 and enables the cable 5 to pass without contact with the arm $r$. The rail $p$ of the trolley $h$ is again raised by the vehicle $e$ giving the cable 5 slack for the springs 2 to act.

The adjustments of the rail $p$ of a trolley $h$, Figs. 8 to 11 are made by carrying the flexible cable 5, through which the positive and negative conductors 26, 27 are carried, more or less coiled around a drum 28 having a peripheral handle 29 carried by a shaft 30 so as to allow it to traverse the full width of the vehicle $e$ on the guide wheels 31 in keyways 32, contact wheels 33 to make contact with a positive conductor 26 and a negative conductor 27, each of which connects at opposite ends of the shaft 30 with a ring 34 with which insulated brushes 35 carried on the vehicle $e$ at 36 and 37 make contact, and from which conductors 26 lead to and make contact with the motor 38 of the vehicle $e$ at 39 by a brush and leave it similarly at 40 to return to the cable 5, trolley rail $p$, the main conductors $a$ $b$ and the generator. The conductors 26 and 27 carried on the shaft 30 are covered by flexible insulating ribbons 41 fixed to the ends of the shaft 30 and pass over the contact wheels 33 to effect contact between them at all times. On each side of the contacting wheels 33 the ribbons 41 are returned to and wedged tight over the conductors 26 and 27 by two wheels 42 in each case. The drum 28 is traversed along the shaft 30 and held at any suitable point by actuating an endless cord 43, passing over pulleys 44 on the vehicle $e$, and connecting at 45 and 46 with a frame 47 embracing the drum 28, it is suspended by rings 48 from the shaft 30, and is prevented from turning by arms 49 with stirrups 50 to act against the rods 51 on the vehicle $e$, and carries wheels 52 to rotate against annular facets 53 on the drum 28 when rotated to adjust the cable 5 to clear parts of another trolley $h$ when passing.

A fast trolley $h$ passes a slow one, Figs. 2 and 8 or one at a stop when its rail $p$ is down, should its rail $p$ be up and inconvenient to lower it, the same is done by the fast one having its rail $p$ lowered, as above, for its leading end 8 to pass between the wheels $g$ of the slow, or stopped trolley $h$, raise and lower them by the inclines $o$, swing them out laterally from the main rail $c$ or $d$ and return them laterally to it by the trailing inclines $o$ as above.

When the trolleys $h$ pass, continuity of the electric circuit is obtained through the conductors $a$ $b$ Fig. 6, their branches $a$ $a$ and $b$ $b$ at supports $f$, the springs $u$ of the frames $s$, and a curved end $x$ of the raised spring $v$, Fig. 2, that bears against the back of the lower spring $v$ after it has passed above its curved end $x$, and where the parts hinge the conductors 26 and 27 are continued by means of spirals 54 to afford flexibility, Figs. 1 and 3.

Four trolleys pass simultaneously and draw positive current from the one conductor $a$ as shown by Fig. 8 on top, where it will be seen, the two trolleys $h$ on each side of the conductors $a$, or $a$ and $b$ when used are carried on the rails $c$ and $d$, and all take the same relative positions as explained for two to pass, except the springs $u$ of the frames $s$ which meet, and if they and their parts are of equal strength both glance aside momentarily, to be returned by the springs $w$ of the tables $q$, Fig. 5, against the conductors a and b, but it is assumed they differ in strength, and one retains contact by its wheel t, Fig. 8 and thereby supplies all four with current through their frames s, as before.

What I claim is—

1. A trolley for electric connection comprising in combination a framework, wheels on said framework adapted to run on a guide rail, a collector wheel adapted to run on conductor wires, a reversely curved guide rail section pivotally mounted on said frame, means for adjusting the position of said curved guide rail section including a flexible electric conductor from the trolley to the vehicle.

2. In a collecting system for electric traction in combination, a guide rail, a conductor wire, and a plurality of trolleys mounted to run on said guide rail, each of said trolleys comprising a framework, wheels on said framework adapted to run on said guide rail, a collector wheel supported from said framework running on the conductor, a reversely curved guide rail section pivotally mounted on said trolley frame, means for swinging said guide rail section into position whereby another trolley may pass thereon including a flexible electric conductor from the trolley to the vehicle.

3. In a collecting system for electric traction in combination, a positive conductor rail, a negative conductor rail, spacers between said conductor rails, supports on said rails, insulation between the rails and the said rail support and spacers, a guide rail, and a plurality of trolleys, each of said trolleys comprising a frame, flanged guide wheels carried by said trolley frame and adapted to run on said guide rail, flanged connecting wheels supported from said trolleys and adapted to run against said conductor rails, means for conducting the current from said collector wheels through the trolley to and from the vehicle, and means carried by the trolley for allowing another trolley to pass the first trolley without interrupting the circuit of either trolley.

4. In a collecting system for electric traction in combination, a main rail, a plurality of trolleys having flanged wheels adapted to run above and below said rail and make electric contact therewith, reversely curved rails adjustably mounted on said trolleys and adapted to move into contact with said main rail, a flexible electric cable connected with said reversely curved rail, springs on said trolley acting normally to hold said reversely curved rail away from the main rails, and means adapted to adjust the length and lateral position of said flexible cable and thereby put a strain on the curved rail to move the same into contact with the main rail, whereby one trolley is enabled to leave the main rail, pass over the curved rail of another trolley and return to the main rail after passing around it, without either of the trolleys stopping, when either are running in either direction, or when one is stopped; together with means for the cable to pass without either meeting any part of a trolley.

In testimony whereof I have affixed my signature, in presence of two witnesses.

ROBERT COOKE SAYER.

Witnesses:
JOHN W. MACKENZIE,
ALBERT JONES.

Copies of this patent may be obtained for five cents each, by addressing the "Commissioner of Patents, Washington, D. C."